Nov. 3, 1970     D. L. ORLOFF ET AL     3,537,129
CONTINUOUS STUFFING SYSTEM
Filed July 13, 1967
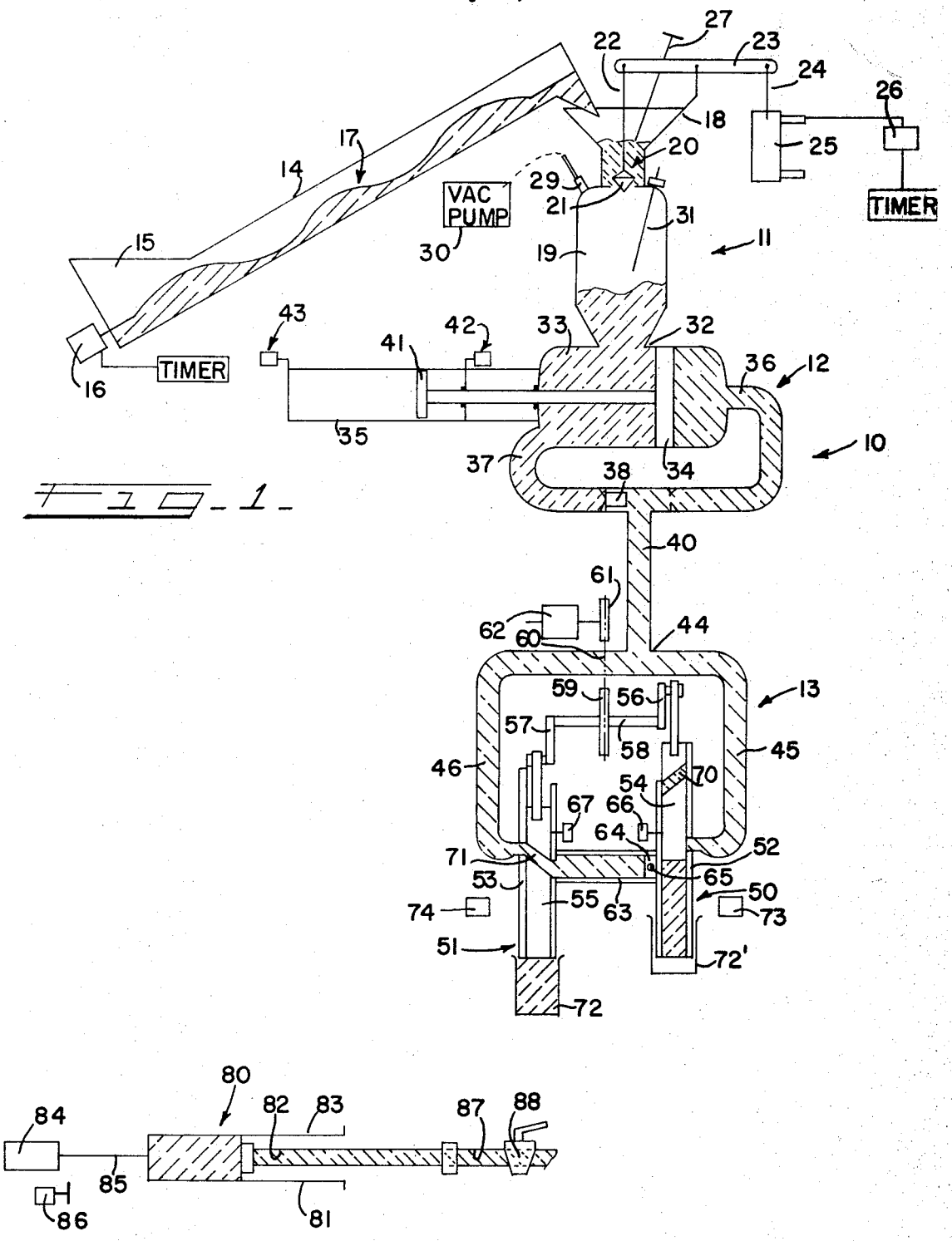
INVENTORS
DANIEL L. ORLOFF
FREDERIC H. MIDDLETON
BY Greist, Lockwood,
Grunewalt & Dewey    ATT'YS.

United States Patent Office
3,537,129
Patented Nov. 3, 1970

3,537,129
CONTINUOUS STUFFING SYSTEM
Daniel L. Orloff, Madison, Wis., and Frederic H. Middleton, Honolulu, Hawaii, assignors to Oscar Mayer & Co., Inc., Chicago, Ill., a corporation of Illinois
Filed July 13, 1967, Ser. No. 653,262
Int. Cl. A22c 11/02, 11/06
U.S. Cl. 17—35
8 Claims

ABSTRACT OF THE DISCLOSURE

A continuous stuffing system in which the product to be stuffed or packaged is deaerated, and while deaerated is continuously conveyed to a stuffer, meat form or the like. The flow of the product into the deaerator is controlled by a timer-operated valve with cutoff assured at a preset level by a level probe. Deaeration is continuous as is the feed to the conveying means. The stuffing means can consist of a meat form, volumetric stuffer or the like.

---

This invention relates to a method and system for handling food products such as meat and the like and, more specifically, is directed to a system for continuously deaerating and stuffing meat products while deaerated.

In the processing of various meat products, it is desirable to provide for packaging the product while relatively free of oxygen. Where the product is packaged by volume, it is desirable to perform the volume measuring function when the product is fully deaerated, as it is then free of voids. Stated in another manner, weight measurement can be accurately obtained by volumetric metering if the product is of uniform weight per unit of volume. This can be accomplished by removal of air voids. In the past, packaging or stuffing has been accomplished by placing a quantity, known as a "batch," of the meat product into a closed chamber and evacuating the air from the same. The deaerated product is conveyed to the stuffing apparatus where it is stuffed or packaged. Obviously, batch operation is not completely satisfactory because of the likelihood of the deaerated batch of meat being subject to the introduction of air as it is delivered into the stuffing apparatus and also the lack of continuity in the operation.

The present invention relates to a closed system in which continuous deaeration is provided as well as delivery to the stuffer, meat form or the like while the product is isolated from the atmosphere. Volumetric metering for accurate weight in packaging is easily accomplished because of the uniform density of the deaerated product. The operation is extremely efficient, especially when compared with the batch system and other known systems of comparable capability because it is continuously operable and relatively uncomplex, providing for better product uniformity and reducing the cost of operation.

It is an object of this invention to provide a continuous stuffing system consisting of a deaerator, product transfer means, and stuffing means, which system is isolated from the atmosphere and which provides for uniform density of the product and oxygen-free packaging.

It is a further object of this invention to provide a system for handling meat products including large chunks of meat and in which the products are delivered to a deaerator and continuously transferred by a pump or equivalent means to a suitable stuffing means in a void-free condition.

Additional objects other than those specifically set forth will become apparent upon consideration of the following description made in conjunction with the accompanying drawings wherein:

FIG. 1 schematically illustrates the continuous stuffing system of the present invention; and FIG. 2 illustrates a modified form of stuffing means.

Referring now to FIG. 1, the basic elements forming a part of the invention consist of a deaerating system indicated generally by reference numeral 11, a product conveying means indicated generally by reference numeral 12, and a stuffing means indicated generally by reference numeral 13.

The details of a typical type of deaerating system 11 used in the present invention is set forth in the co-pending application Ser. No. 643,199, filed June 2, 1967, now Pat. No. 3,464,343, dated Sept. 2, 1969, entitled Continuous Deaerator. This includes a conveying means 14, having a lower hopper 15 into which the product to be deaerated and packaged may be dumped. For example, tote bins filled with meat chunks may be elevated and dumped into the lower hopper 15 by fork lift trucks or the like. A drive motor 16 drives a conventional worm in the conveying means to elevate the product shown generally at 17 to an upper hopper 18 which is positioned above a deaerating chamber 19.

The upper hopper 18 is of general funnel shape and is provided at its lower end with a sleeve 20 surrounding a ball valve 21, the latter having a stem 22 permitting it to be opened and closed on movement of a pivoting lever 23. The outer end of the lever 23 is attached to a piston rod 24 extending from the cylinder of a fluid motor 25, which motor is controlled by a solenoid operated valve of known type, shown schematically at 26. The frequency of conveyor operation is set by a timer of known type which energizes the drive motor 16 at predetermined intervals while a level sensing probe 27 projects into the upper hopper 18 to sense the level of the product 17, operating to cut off the operation of the conveyor 14 by de-energizing the drive motor 16 when the product level reaches the lower end of the probe 27.

The solenoid operated valve 26 is operated at timed intervals to admit fluid to the cylinder of the fluid motor 25 moving the piston rod and causing the lever 23 to pivot, resulting in elevation or opening of the ball valve 21. In the preferred embodiment, the valve is timed to pulsate, opening and closing at set intervals until the product reaches a certain level. This permits the individual pieces of product 17 to fall into the deaerating chamber 19 where complete deaeration occurs as a vacuum pump 30 is continuously evacuating the deaerating chamber 19 through an exhaust port 29. The head of meat in the cylindical section 20 of the upper hopper 18 is maintained at a suitable level to preclude the substantial loss of vacuum during opening and closing of the valve 21 and the pulsating operation of the valve assists in preventing loss of vacuum.

A level sensing probe 31 extends into the deaerating chamber 19 and is operable to cause the solenoid operated valve 26 to energize the cylinder 25 and move the ball valve 21 to the closed position when the product level in the chamber 19 touches the lower end of the probe. The valve may be opened at timed intervals by a timer, indicated schematically at the end of the probe is cleared.

The lower end of the deaerating chamber 19 is provided with a throat or opening 32 which is in continuous communication with the product conveying means, in the present case, a reciprocating transfer pump. In the present design, the reciprocating transfer pump consists of a closed cylinder 33, having a reciprocating piston 34 therein, is driven by hydraulic motor 35 and entraps the deaerated product falling through the throat 32 into the cylinder 33 and forces it out one of the conduits 36 and 37 forming passageways or outlets at opposite ends of the cylinder 33, depending on the direction of piston travel. A shuttle valve 38 operates in response to the pressure of the product to shift from blocking the passage 37 to blocking the passage 36 and vice versa in response to piston movement, always assuring that the product will flow out the central conduit 40 to the stuffing means 14. The pump 12 is in continuous communication with the deaerating chamber and, therefore, permits the free flow of the product through the throat 32 into the cylinder 33 while in the deaerated condition. Feed into the pump chamber is assured by the force of gravity alone.

The hydraulic cylinder 35 operating the pump is controlled by a suitable circuit, such as the one described in the co-pending application to F. H. Middleton, Ser. No. 533,359, filed Mar. 10, 1966, now Pat. No. 3,422,489, dated Jan. 2, 1969, and the disclosure of which is incorporated by reference. Hydraulic fluid is fed to the motor 35 to force the power piston 41 to move between the limits established by limit switches 42 and 43. If desired, suitable means such as an accumulator may be provided in the fluid circuit of the motor to cause a rapid traverse of the piston 34 under a "no load" condition after completion of the pumping portion of the cycle. For example, when the piston 34 is past the throat 32, its rate of travel may be increased until such time that the pressure or resistance to movement generated by the meat will cause the pump to operate at a slower rate. At this time, the motor operates at a uniform rate, causing uniform flow of the product through the outlet conduit 40. A T-branch 44 joins the conduit 40 to inlet lines 45 and 46 forming a part of the stuffing means 13. The inlet lines 45 and 46 are always filled with the product 17 after start up, making it continuously available for the stuffing means 13.

The particular stuffing means 13 shown in FIG. 1 consists of a volumetric metering stuffer shown. The details of the metering stuffer may be found in the co-pending application of D. L. Orloff, Ser. No. 626,136, filed Mar. 27, 1967, now Pat. No. 3,473,579, dated Oct. 21, 1969, and entitled Metering Stuffer, the disclosure of which is incorporated by reference. The volumetric metering stuffer includes stuffing horns 50 and 51 formed at the end of cylinders 52 and 53. Rams 54 and 55 are driven by connecting rods joined to crank arms 56 and 57, respectively. The crank arms are attached to the ends of a rotary shaft 58 which is driven by a sprocket 59 joined by a drive chain 60 to a drive sprocket 61. The drive sprocket 61 is rotated by a rotary hydraulic actuator 62 of known type in response to controlled admission of hydraulic fluid.

A metering passageway 63 connects the cylinders 52 and 53 and houses a freely movable or floating piston 64 which isolates one cylinder from the other. The free floating piston 64 has a ferromagnetic core 65 which co-operates with magnetic sensors 66 and 67 located adjacent each of the cylinders 52 and 53, respectively. The ferromagnetic element 65 and sensors 66 and 67 form a part of an "and" logic circuit, as will be seen.

Each of the rams 54 and 55 is self-valving, having a port 70 and 71, respectively, both of which are alternately brought into communication with the associated inlet lines 45 and 46 and the metering passageways 63. In the diagram shown, the port 71 is located in the ram 55 to admit product 17 to the metering passageway 63 at the completion of the stroke of the ram 55. Product flow into the metering passageway 63 moves the free floating piston 64 to the position shown, causing ejection of the previously metered quantity into the path of the ram 54 which ejects it into a can or suitable package container 72'.

It is to be appreciated that the metering function, that is, admission of the product 17 into the metering passageway 63 is accomplished without exposing the product to the atmosphere. Therefore, the quantity is volumetrically measured while the product is in a deaerated condition for obtaining greatest accuracy in volume and weight where the product density is uniform. The incoming product forces the free floating piston 64 to the position shown, ejecting the previously measured batch or quantity of product into the path of the stuffing ram 54. When the can 72' is positioned over the stuffing horn 50, a magnetic sensing means 73 detecting its presence. The sensing means 73 forms the other part of an "and" logic circuit, co-operating with the sensor 66 which detects the dependent or other condition. When the can is in position and the ferromagnetic element 65 is in the position shown, a solenoid operated valve opens, admitting fluid to the rotary hydraulic actuator 62, causing rotation of the sprocket 61 and shifting the position of the rams by rotating the sprocket 59 through 180°. This causes the ram 54 to stuff the product 17 into the can 72' and, at the end of the stroke, aligns the cross port 70 with the inlet 45 and metering passageway 63 to admit product 17 from the inlet 45, through the port 70, and into the metering passageway 63. As the product is under pressure from the pumping means 12, the free floating piston 64 moves to the other end of the passageway 63 adjacent the sensing means 67, ejecting the measured quantity into the path of the ram 55 which has retracted. When the can 72 is positioned over the stuffing horn 51, a magnetic or other suitable sensor 74 detects this condition. If the other condition of the "and" logic circuit is satisfied, a solenoid operated valve admits fluid to the opposite side of the rotary actuator, reversing its cycle to move the ram back to the position shown. The cycle may then be repeated.

In summarizing the operation, the continuous stuffing system 10 operates as follows: When a suitable level of vacuum is established in the chamber 19, power is supplied to the control circuit for the entire system. The product to be packaged is elevated by the conveyor 14 to fill the upper hopper 18, with the level sensing probe 27 terminating the operation of the conveyor 14 by cutting off the power to the drive motor 16. As briefly described above, the solenoid operated valve 26 is controlled by a standard timer, indicated schematically, such as an Eagle Timer type HP517A6, controlling the flow of fluid to the fluid motor 25 which operates the lever 23 to pulsatingly open and close the ball valve 21. Atmospheric pressure and gravity combine to push the product into the deaerating chamber 19 individually, with cutoff assured when the quantity of product in the chamber reaches the level established by the position of the lower end of the probe 31. At this time, the solenoid valve 26 operates in a reverse direction, causing reverse operation of the fluid motor 25, moving the ball valve 21 to the closed position shown. The timer will not commence to "time out" until the lower end of the probe is cleared by the product.

The product conveying means or transfer pump 12 operates continuously on demand, pumping the product 17 through the outlet lines 36 and 37 with a continuous flow of deaerated product to the pumping cylinder 33 supplied under the influence of gravity which causes it to drop through the throat 32 into the cylinder 33.

The pump is reciprocated by the hydraulic fluid motor 35 between the limits established by limit switches 42 and 43. Suitable solenoid operated valves (not shown) are provided to control the flow of fluid to the motor on opposite sides of the piston 41 to assure the appropriate direction of operation. The pump makes product continuously available at the stuffer on demand so that as the stuffers alternate in stuffing the cans 72 and 72', the metering passageway 63 is always maintained in a void-free filled condition for accurate measurement of the desired quantity for stuffing. Simultaneously with the filling of the passageway 63, the previously metered quantity is ejected into the path of the associated ram for stuffing into the can. At this time, the product 17 is exposed to atmosphere, however, this is immaterial since the volume or quantity to be stuffed already has been accurately determined and hence the weight is also determined. When no demand exists, a check valve or similar means is provided in the pump circuit to cut off operation or bypass the motive fluid back to the supply when no demand for product exists. This feature is described in the co-pending application on the pump alluded to above.

A modified form of stuffing means is indicated generally at 80 in FIG. 2 consisting of a meat form 81 of known type. The meat form includes an outlet opening 82 formed in the horn 83. The horn 83 fits within the form 81 with a reasonably snug fit to permit the product to be metered into the form 81 without permitting the entry of air. Suitable back pressure is provided on the meat form 81 by means of a suitable check 84 which may be hydraulic, air, or a combination of air and hydraulic check, acting through a piston rod 85. A limit switch 86 is provided to engage the meat form when filling is complete and actuates the solenoid valve to cut off the operation of the pump 12. As is evident, a product inlet line 87 communicates with the inlet 82 and in normal operation is in closed communication with the conduit 40. A manually operated valve 88 may be provided to cut off product flow. As the entire stuffing system is closed to atmosphere from the time the product enters the deaerating chamber 19, the forms may be filled in a void-free manner. Subsequent slicing may be done on a thickness controlled basis whereby weight may be accurately determined by merely counting the slices.

From the foregoing description, it can be appreciated that the continuous stuffing system provides advantages over known types. It permits continuous deaeration and feeding of the product to the stuffer without requiring physical change in the product make-up. Thus, meat chunks of the order of two or three pounds can be packaged without requiring grinding or cutting. As the system is automatically controlled, the labor required is minimized although weight control, product quality and appearance are improved over known types of packaging methods.

Upon a consideration of the foregoing, it will become obvious to those skilled in the art that various modifications may be made without departing from the invention embodied herein.

We claim:

1. A system adapted for use in deaerating and stuffing meat products into meat forms or the like, said system comprising, in combination, a hopper means containing a supply of the product, a deaerating chamber, means interconnecting said hopper means and said deaerating chamber and including valve means operated in accordance with the volume of said product in the deaerating chamber to control flow of said product from said hopper means into said deaerating chamber, a stuffing means, means connecting said stuffing means with said deaerating chamber including conveying means connected to said deaerating chamber and operable to transfer said product after deaeration from said deaerating chamber to said stuffing means, and said stuffing means having means for measurement of successive predetermined volumes of said product while in a deaerated condition, whereby said product will be free of voids during conveying and stuffing and each measured volume thereof will be of uniform weight.

2. The system of claim 1 wherein said stuffing means consists of a form of predetermined shape having means to maintain back pressure on said form to assure uniform void-free filling of said product.

3. The system of claim 1 wherein said stuffing means comprises a volumetric metering stuffer having a metering passageway therein, said metering passageway being in communication with said conveying means and having associated means for measurement of successive uniform quantities of the product to be stuffed prior to exposure of said product to atmosphere.

4. A closed continuous stuffing system for use in stuffing meat product into a package, meat form or the like, said continuous stuffing system comprising a deaerating means, hopper means positioned above said deaerating means for receiving a supply of the product, a connecting throat through which said product is directed into said deaerating means, valve means operative according to the volume of product in said deaerating means for controlling the flow of said product from said hopper means into said deaerating means, a product transfer means connected to said deaerating means, a product stuffing means connected to said product transfer means, said product transfer means including outlet means in communication with stuffing means and a means for forcing the product through said outlet means on demand whereby to stuff said product into a package, meat form or the like at a uniform rate so as to be free of voids.

5. A closed system for use in deaerating and stuffing meat products and the like into a packaging container, said system comprising a deaerating chamber for continuously deaerating said products and having a discharge throat, a conveying means connected to said discharge throat so as to be in continuous communication with said deaerating chamber, said conveying means including pump means and closed conduit means for directing said product away from said deaerating chamber, and stuffer means receiving said product from said conduit in a uniform deaerated condition for stuffing thereof, said stuffer means including means to maintain back pressure on said product during stuffing into the container for void-free filling thereof.

6. The closed system of claim 5 wherein said stuffer means receiving said product includes means to measure a predetermined unit volume of said product before exposure thereof to atmosphere whereby the weight per unit volume of said product will be substantially uniform for accurate measurement.

7. The method of measuring and stuffing a product while said product is in a deaerated condition, said method consisting of feeding said product to a deaerator in response to the volume of said product in the deaerator, said deaerator being subjected to a continuous vacuum whereby said product will be continuously deaerated, feeding said product while in a deaerated condition from said deaerator to a conveying means, maintaining said product in a deaerated condition while said conveying means moves said product to a stuffing means for stuffing thereof, and measuring and separating successive volumes of said deaerated product while simultaneously stuffing said product.

8. The method of deaerating and stuffing products such as chunks of meat into a container, meat form or the like, said method comprising continuously evacuating a chamber which is closed by a quantity of the product at the top entrance and at the bottom discharge ends thereof, dropping said product into said chamber so as to assure a free fall of said product into said chamber for complete deaeration thereof, continuously feeding said deaerated product from the discharge end of said chamber to a stuffing means while maintaining said product in a deaerated condition, and volumetrically measuring successive quantities of said product while in a deaerated and uniform void-free condition for stuffing with accurate weight control of the successive quantities thereof.

References Cited

UNITED STATES PATENTS

| 3,081,484 | 3/1963 | Schnell | 17—35 |
| 3,108,318 | 10/1963 | Miller et al. | 17—39 |
| 3,161,910 | 12/1964 | Hughes | 17—39 |
| 3,177,525 | 4/1965 | Mahoney | 17—35 |

FOREIGN PATENTS 1,025,750   3/1958   Germany.

LUCIE H. LAUDENSLAGER, Primary Examiner

U.S. Cl. X.R.

17—49